(12) United States Patent
Ott et al.

(10) Patent No.: US 10,934,890 B2
(45) Date of Patent: Mar. 2, 2021

(54) SHROUDED CONDUIT FOR ARRANGING A FLUID FLOWPATH

(71) Applicant: United Technologies Corporation, Hartford, CT (US)

(72) Inventors: Joe Ott, Enfield, CT (US); Dennis M. Moura, South Windsor, CT (US); Stanley J. Funk, Southington, CT (US); Shawn Stempinski, Simsbury, CT (US); Roger O. Coffey, Glastonbury, CT (US); John J. Rup, Jr., Willington, CT (US); Lexia Kironn, Rocky Hill, CT (US); Gary A. Schirtzinger, Glastonbury, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 590 days.

(21) Appl. No.: 14/707,675

(22) Filed: May 8, 2015

(65) Prior Publication Data
US 2015/0322820 A1 Nov. 12, 2015

Related U.S. Application Data

(60) Provisional application No. 61/991,149, filed on May 9, 2014.

(51) Int. Cl.
*F01D 25/24* (2006.01)
*F01D 9/06* (2006.01)
(Continued)

(52) U.S. Cl.
CPC ............ *F01D 25/24* (2013.01); *B22F 3/1055* (2013.01); *B22F 5/04* (2013.01); *B22F 5/10* (2013.01);
(Continued)

(58) Field of Classification Search
CPC . F01D 25/24; F01D 9/065; F01D 5/18; F01D 5/186; F01D 5/188; F01D 5/189;
(Continued)

(56) References Cited

U.S. PATENT DOCUMENTS

| 4,076,452 | A | * | 2/1978 | Hartmann | F01D 9/065 415/142 |
| 4,183,207 | A | * | 1/1980 | Libertini | F01D 9/065 184/6.11 |

(Continued)

FOREIGN PATENT DOCUMENTS

| GB | 2440546 A | 2/2008 |
| JP | 60182304 | 9/1985 |
| WO | WO2009148680 A2 | 12/2009 |

OTHER PUBLICATIONS

EP office action for EP15167221.9 dated Dec. 8, 2016.
EP search report for EP15167221.9 dated Oct. 1, 2015.

*Primary Examiner* — Michael Lebentritt
*Assistant Examiner* — Jesse M Prager
(74) *Attorney, Agent, or Firm* — Getz Balich LLC (57) ABSTRACT

A shrouded conduit is provided for arranging, for example, in a gas path of a turbine engine. The shrouded conduit includes a tubular shroud extending longitudinally along a centerline. The shrouded conduit also includes a fluid conduit extending longitudinally in the shroud. A first portion of the fluid conduit is connected laterally to and may be formed integral with a first portion of the shroud.

7 Claims, 9 Drawing Sheets

(51) Int. Cl.
 *B22F 3/105* (2006.01)
 *B22F 5/10* (2006.01)
 *B22F 5/04* (2006.01)
 *F23K 5/14* (2006.01)
 *F02C 7/22* (2006.01)
 *F01D 25/16* (2006.01)
 *F16L 9/18* (2006.01)

(52) U.S. Cl.
 CPC .............. *F01D 9/065* (2013.01); *F02C 7/222* (2013.01); *F23K 5/14* (2013.01); *F01D 25/162* (2013.01); *F05D 2230/22* (2013.01); *F05D 2230/31* (2013.01); *F16L 9/18* (2013.01); *F23K 2300/20* (2020.05); *Y02P 10/25* (2015.11); *Y10T 29/49828* (2015.01)

(58) Field of Classification Search
 CPC ...... F01D 25/162; F23K 5/14; F23K 2301/20; F02C 7/222; F05D 2230/22; F05D 2230/31; B22F 5/04; B22F 5/10; B22F 3/1055; F16L 9/18; Y10T 29/49828
 See application file for complete search history.

(56) References Cited

U.S. PATENT DOCUMENTS

| | | | |
|---|---|---|---|
| 5,598,696 A * | 2/1997 | Stotts | F02C 7/22 60/740 |
| 6,030,176 A * | 2/2000 | Oeynhausen | F01D 9/065 415/111 |
| 6,038,862 A * | 3/2000 | Melman | F23D 11/36 431/114 |
| 6,163,959 A * | 12/2000 | Arraitz | F01D 9/065 29/889.1 |
| 6,240,731 B1 | 6/2001 | Hoke et al. | |
| 6,412,272 B1 | 7/2002 | Titterton, III | |
| 6,715,292 B1 | 4/2004 | Hoke | |
| 7,007,864 B2 | 3/2006 | Snyder | |
| 8,127,547 B2 | 3/2012 | Norris | |
| 8,186,164 B2 | 5/2012 | Cowan | |
| 8,197,184 B2 | 6/2012 | Chon | |
| 8,209,987 B2 | 7/2012 | Hautman | |
| 8,291,706 B2 | 10/2012 | Tanner | |
| 2002/0073708 A1* | 6/2002 | Lavie | F23D 11/36 60/740 |
| 2006/0042223 A1 | 3/2006 | Walker et al. | |
| 2006/0288686 A1 | 12/2006 | Cherry et al. | |
| 2010/0065142 A1* | 3/2010 | Mcmasters | B23P 6/007 138/115 |
| 2011/0247590 A1* | 10/2011 | Donovan | F23R 3/283 123/470 |
| 2012/0227371 A1* | 9/2012 | Johnson | F01D 9/065 60/39.83 |
| 2012/0266439 A1* | 10/2012 | Geiger | B22F 3/1055 29/428 |
| 2014/0010649 A1 | 1/2014 | Farah | |
| 2014/0079540 A1 | 3/2014 | Morris et al. | |
| 2016/0237828 A1* | 8/2016 | Burd | B22F 5/04 |

\* cited by examiner

SHROUDED CONDUIT FOR ARRANGING A FLUID FLOWPATH

This application claims priority to U.S. Patent Appln. No. 61/991,149 filed May 9, 2014.

BACKGROUND OF THE INVENTION

1. Technical Field

This disclosure relates generally to a shrouded conduit for arranging in a fluid flowpath extending through a stationary structure of, for example, a turbine engine.

2. Background Information

A turbine engine as well as various other types of industrial and consumer equipment may include a fluid circuit for delivering or circulating fluid such as fuel, lubricant and/or coolant. Such a fluid circuit may include a fluid conduit that extends across a fluid flowpath of another structure. To shield the fluid conduit from fluid flowing within the fluid flowpath, the fluid conduit may be disposed in a shroud. Such a shroud typically has a circular cross-sectional geometry to simplify and reduce cost of manufacturing. A circular shroud cross-sectional geometry, however, may generate relatively large flow disturbances; e.g., turbulence. These flow disturbances may reduce the efficiency of the turbine engine.

There is a need in the art from an improved shrouded conduit.

SUMMARY OF THE DISCLOSURE

According to an aspect of the invention, a shrouded conduit is provided for arranging in a gas path of a turbine engine. The shrouded conduit includes a tubular shroud extending longitudinally along a centerline. The shrouded conduit also includes a fluid conduit extending longitudinally in the shroud. A first portion of the fluid conduit is connected laterally to and formed integral with a first portion of the shroud.

According to another aspect of the invention, an assembly is provided that includes a component, a fluid conduit and a shroud. The fluid conduit is fluidly coupled with the component. The shroud circumscribes and shields the fluid conduit. A first portion of the shroud is connected laterally to and formed integral with a first portion of the fluid conduit.

According to still another aspect of the invention, a method is provided for manufacturing at least a portion of a shrouded conduit. This shrouded conduit includes a shroud and a fluid conduit. The method includes a step of forming the shroud and the fluid conduit using an additive manufacturing system. The shroud extends longitudinally along a centerline. The conduit extends longitudinally in the shroud. A first portion of the fluid conduit is connected laterally to a first portion of the shroud.

The shroud may extend longitudinally along a centerline. The fluid conduit may extend longitudinally in the shroud.

The assembly may include a structure (e.g., a stationary structure) through which a fluid flowpath extends. The shroud may be disposed within the fluid flowpath.

The component may be configured as or include a turbine engine component.

A second portion of the fluid conduit may be connected laterally to and formed integral with a second portion of the shroud.

The first portion of the fluid conduit may be substantially laterally opposed to the second portion of the fluid conduit.

The fluid conduit may be arranged laterally between a plurality of channels that extend longitudinally within the shroud.

An outer surface of the fluid conduit may be contiguous with an inner surface of the shroud.

The shrouded conduit or assembly may include a spar. This spar may laterally connect the first portion of the fluid conduit to the first portion of the shroud.

The shrouded conduit or assembly may include a second spar. This second spar may laterally connect a second portion of the fluid conduit to a second portion of the shroud. The second spar may be located a longitudinal distance from the spar. At least a portion of the second spar may also or alternatively be longitudinally aligned with at least a portion of the spar.

The shroud may be configured as or include a hollow vane.

The shroud may have an elongated cross-sectional geometry.

The shrouded conduit or assembly may include a second fluid conduit extending longitudinally in the shroud. A first portion of the second fluid conduit may be connected laterally to a second portion of the shroud. A second portion of the second fluid conduit may be connected to a second portion of the fluid conduit.

The shrouded conduit or assembly may include a second fluid conduit extending longitudinally in the shroud. A first portion of the second fluid conduit may be connected laterally to a second portion of the shroud. The second fluid conduit may be discrete from the fluid conduit.

The shrouded conduit or assembly may include a second fluid conduit extending longitudinally in the fluid conduit.

The forming step may include forming the shroud and the fluid conduit integral with one another.

The method may include a step of attaching (e.g., mechanically fastening and/or bonding) the first portion of the fluid conduit to the first portion of the shroud. The framing step may include forming the shroud and the fluid conduit as separate units.

The foregoing features and the operation of the invention will become more apparent in light of the following description and the accompanying drawings.

DETAILED DESCRIPTION OF THE INVENTION

Figure 1:
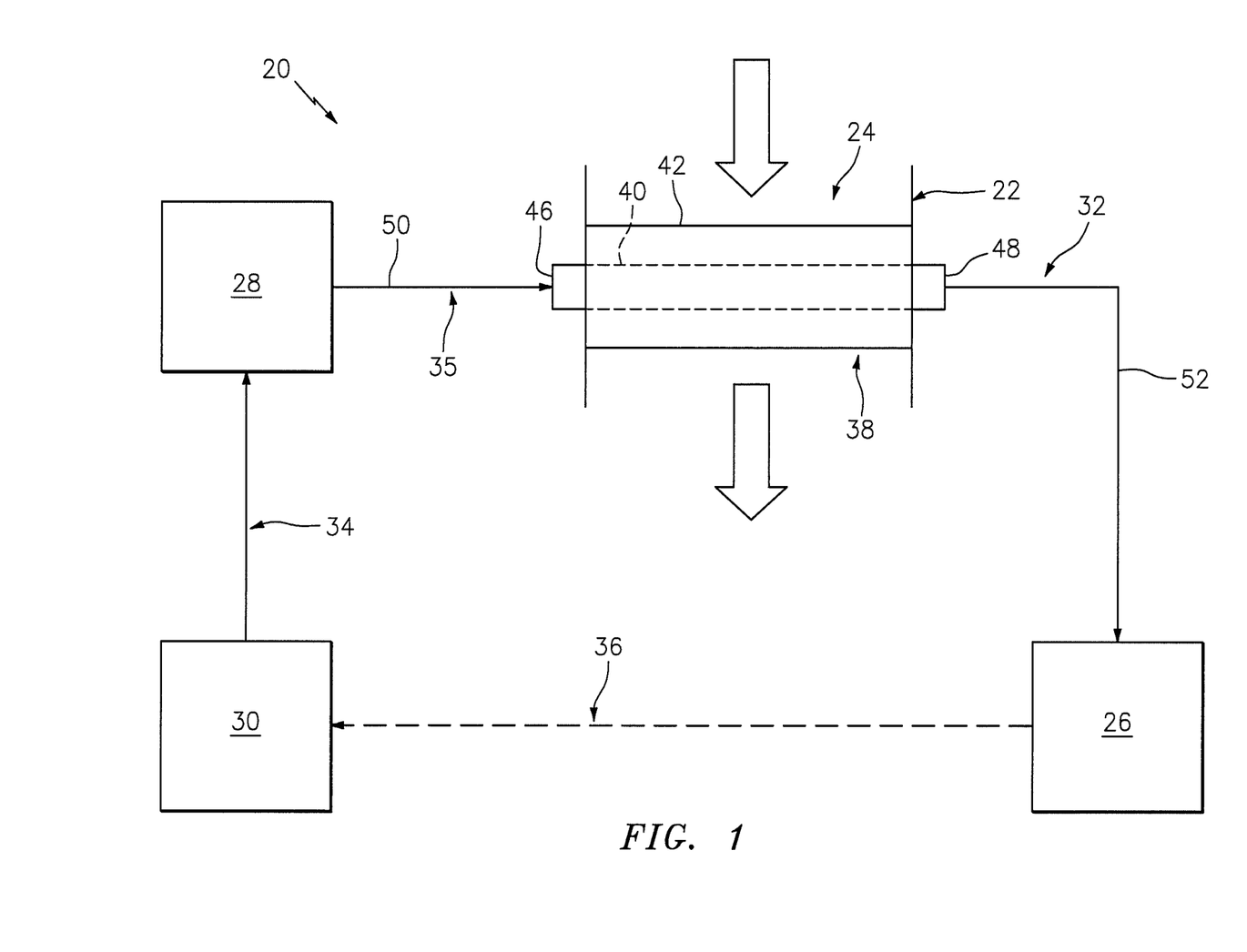
FIG. 1 is a block diagram of a fluid delivery system arranged with a stationary structure and fluidly coupled with a component.

FIG. 1 is a block diagram of a fluid delivery system 20 arranged with a stationary structure 22. This stationary structure 22 may be configured as or include a duct through which a fluid flowpath 24 extends. The stationary structure 22, for example, may include a turbine engine inner case and a turbine engine outer case, which cases form an annular gas path therebetween. The stationary structure 22, however, is not limited to the foregoing exemplary configuration. The stationary structure 22, for example, may alternatively be configured as or include an HVAC duct or a liquid conduit.

The fluid delivery system 20 is configured to deliver fluid to a component 26. The fluid delivery system 20 may also be configured to receive fluid from the component 26 as illustrated by the dashed line in FIG. 1; e.g., circulate the fluid through the component 26.

The component 26 may be configured as or include a heat exchanger, a bearing, a gear train, a nozzle, a combustor, an augmentor, a diffuser or any device in a turbine engine (e.g., a fan component, a compressor component, etc.) that receives fluid. The fluid delivery system 20, however, is not limited to delivering fluid to the exemplary components described above. Furthermore, the fluid delivery system 20 may also be configured to deliver the fluid to a plurality of components in serial and/or in parallel, some or all of which may have the same configuration or different configurations.

The fluid may be heat exchange fluid (e.g., liquid and/or gaseous coolant), and delivered to cool or heat the component 26. The fluid may be actuator fluid (e.g., hydraulic liquid or compressed air), and delivered to actuate the component 26. The fluid may be fuel, and delivered for distribution by or combustion within the component 26. The fluid delivery system 20, however, is not limited to delivering the exemplary fluids described above.

The fluid delivery system 20 of FIG. 1 includes a fluid pump 28 and a fluid source 30; e.g., a reservoir, a tank, a sump or an inlet. The fluid delivery system 20 also includes a fluid circuit 32 that fluidly couples the components 26, 28 and 30 together in an open loop, or in a closed loop as shown by the dashed line.

The fluid circuit 32 includes a plurality of fluid couplings 34-36 and at least one shrouded conduit 38. Each of the couplings 34-36 includes one or more coupling devices, which Bonn a fluid flowpath through which the fluid may be directed between respective components. Examples of a coupling device include, but are not limited to, a conduit (e.g., a pipe, hose or duct), a manifold, a splitter, a valve, a regulator, a meter and a filter.

The coupling 34 may extend between and fluidly couples the fluid source 30 to the fluid pump 28. The coupling 35 may extend between and fluidly couples the fluid pump 28 to the component 26. The coupling 36 may extend between and fluidly couples the component 26 to the fluid source 30.

Figure 2:
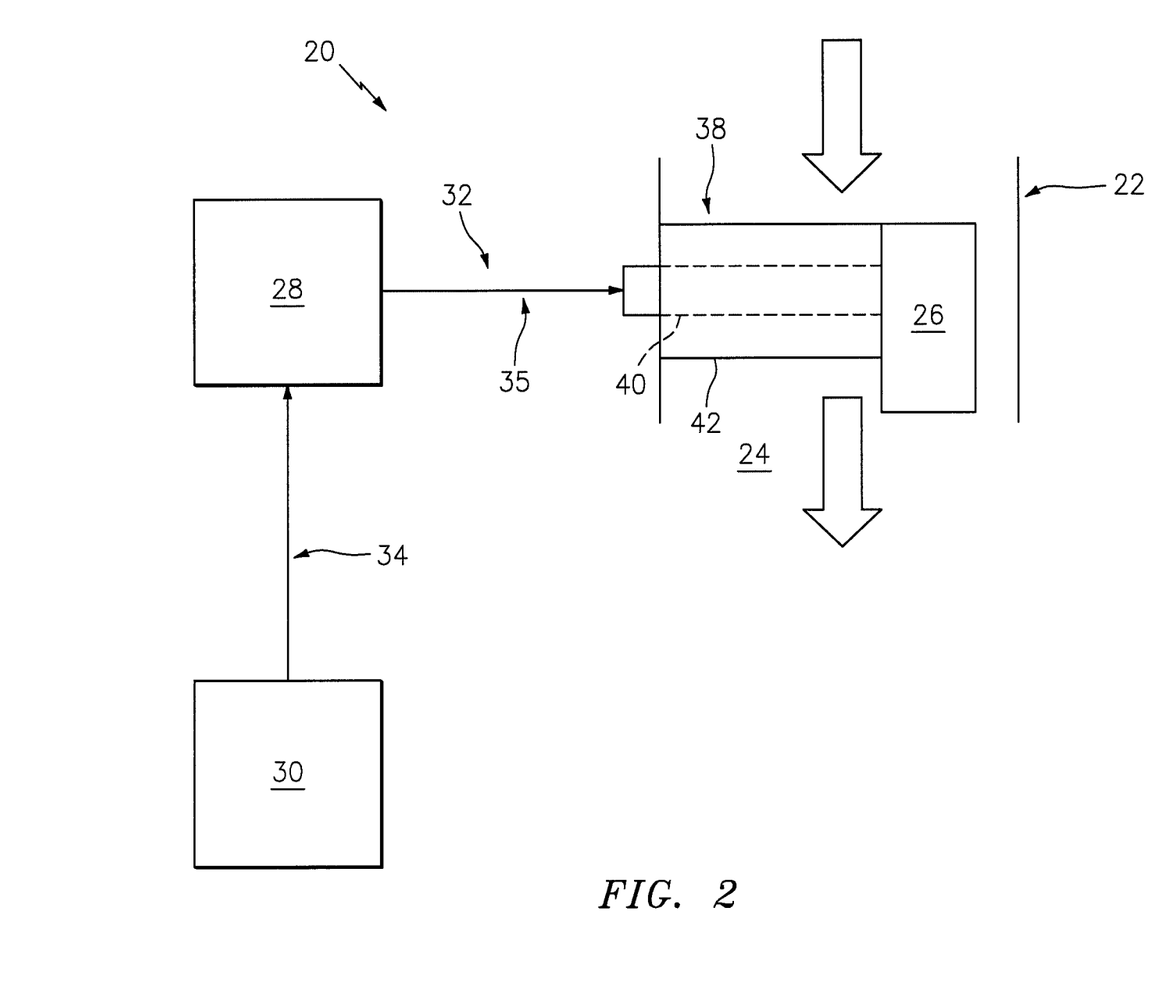
FIG. 2 is a block diagram of an alternate embodiment fluid delivery system arranged with the stationary structure and fluidly coupled with the component.

The shrouded conduit 38 is adapted to route at least a portion of one of the couplings 34-36 (e.g., coupling 35) across the fluid flowpath 24. Alternatively, referring to FIG. 2, the shrouded conduit 38 may be adapted to route at least a portion of one of the couplings 34-36 (e.g., coupling 35) into the fluid flowpath 24 where, for example, the component 26 is arranged within the fluid flowpath 24. The shrouded conduits 38 of FIGS. 1 and 2 are also each adapted to shield the respective coupling 34-36 from fluid (e.g., high temperature compressed air) flowing through the fluid flowpath 24 (e.g., gas path) as described below in further detail. The term "shield" may describe thermally decoupling and/or fluidly separating one object from another.

For ease of description, the shrouded conduit 38 is described below and illustrated in FIG. 1 as forming the coupling 35. However, in other embodiments, the shrouded conduit 38 may alternatively form one of the other couplings 34 or 36. Furthermore, in some embodiments, the fluid circuit 32 may include a plurality of shrouded conduits 38 extending across or into the fluid flowpath 24 and/or another fluid flowpath.

Figure 3:
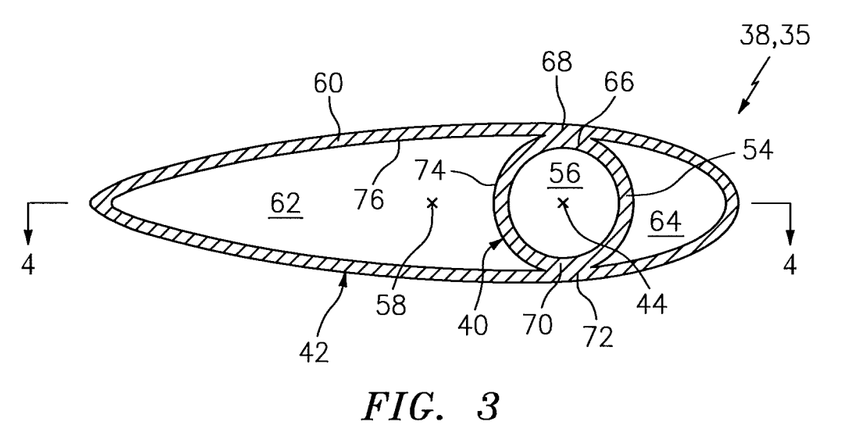
FIG. 3 is a cross-sectional illustration of a shrouded conduit.
Figure 4:
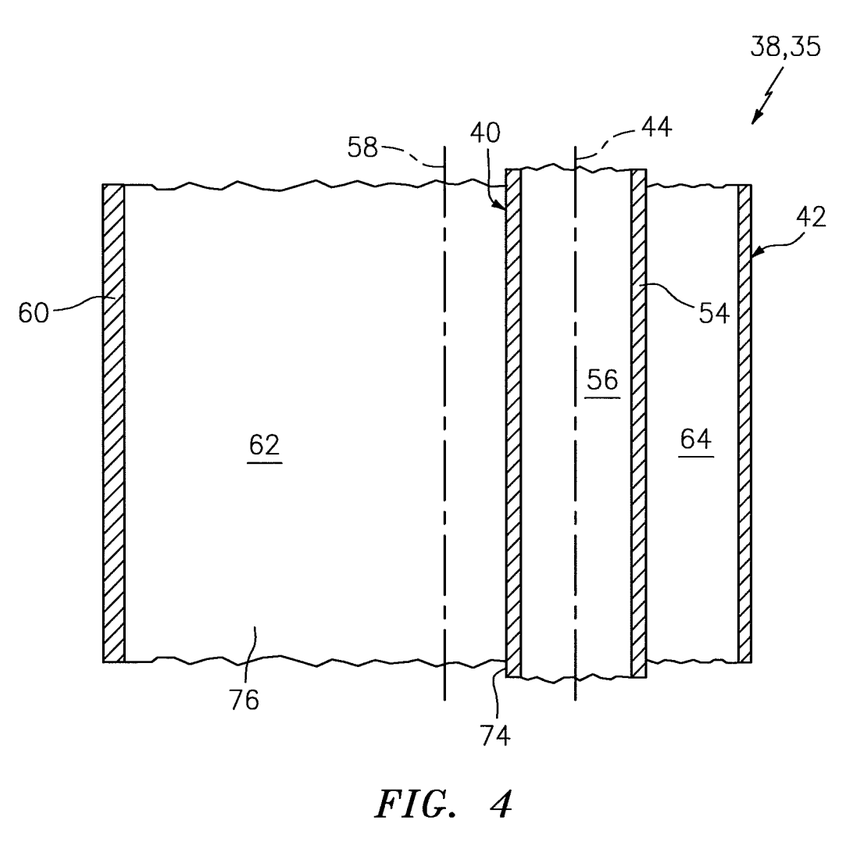
FIG. 4 is a partial side sectional illustration of the shrouded conduit of FIG. 3.

Referring to FIGS. 3 and 4, the shrouded conduit 38 includes a fluid conduit 40 and a shroud 42; e.g., a fluid dynamic hollow foil. The fluid conduit 40 may be configured as a pipe, a hose, a duct or any other generally tubular object for directing fluid therethrough. However, for ease of description, the fluid conduit 40 is illustrated in FIGS. 3 and 4 as a pipe.

Referring to FIG. 1, the fluid conduit 40 forms at least a portion of the coupling 35. The fluid conduit 40, for example, extends longitudinally along a centerline 44 (see FIG. 4) between a first end 46 and a second end 48. The first end 46 is connected to a second fluid conduit 50, which fluidly couples the fluid conduit 40 to the fluid pump 28. The second end 48 is connected to a third fluid conduit 52, which fluidly couples the fluid conduit 40 to the component 26. However, in other embodiments, the first end 46 may be directly connected to the fluid pump 28 and/or the second end 48 may be directly connected to the component 26.

Figure 5:
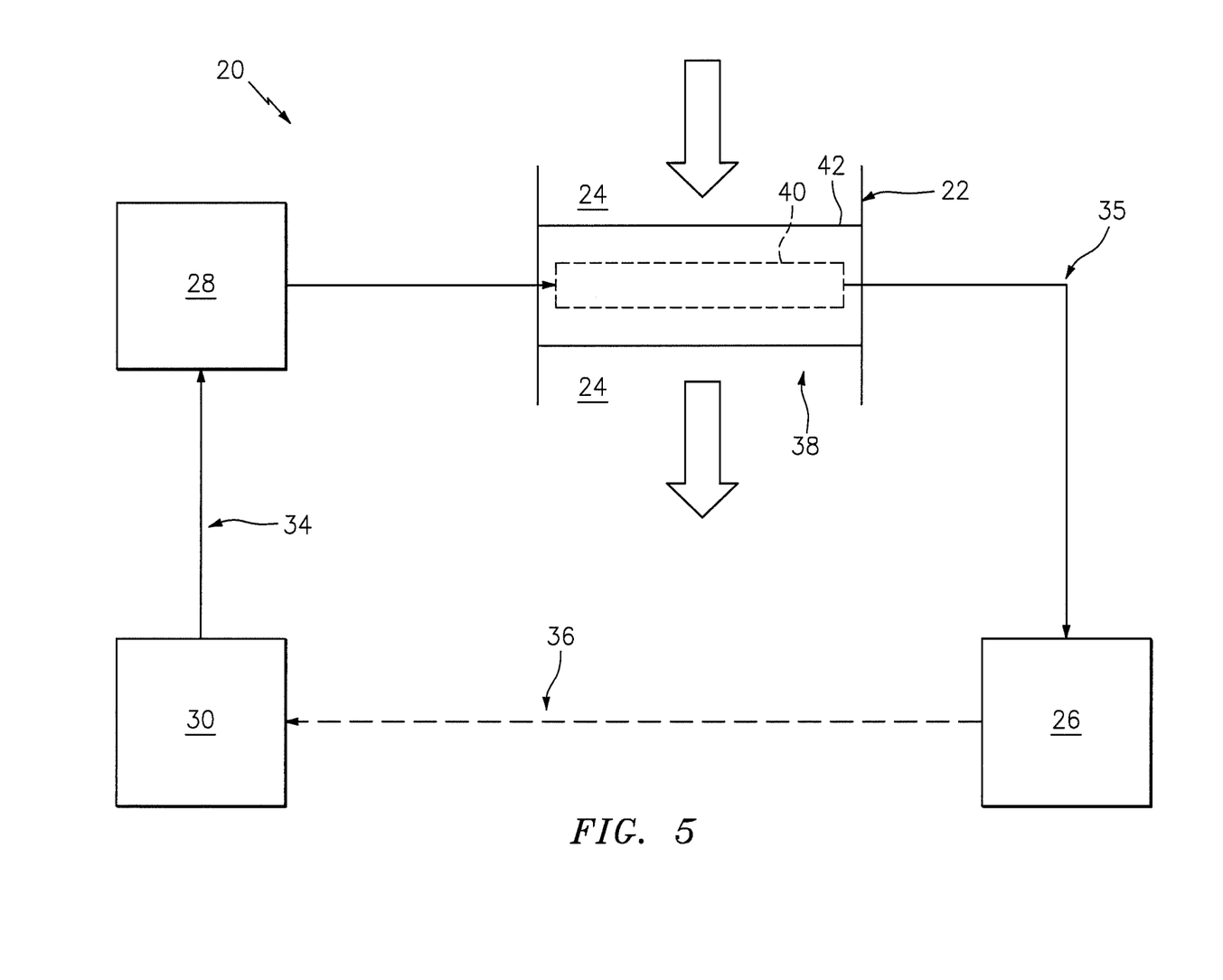
FIG. 5 is a block diagram of another alternate embodiment fluid delivery system arranged with the stationary structure and fluidly coupled with the component.

The fluid conduit 40 may extend longitudinally through the shroud 42 as illustrated in FIG. 1. Alternatively, the fluid conduit 40 may extend longitudinally partially into (or out of) the shroud 42 as illustrated in FIG. 2. Still alternatively, the fluid conduit 40 may extend longitudinally within the shroud 42 as illustrated in FIG. 5.

Referring to FIGS. 3 and 4, the fluid conduit 40 may have a generally tubular sidewall 54 that forms a fluid flowpath 56. This fluid flowpath 56 extends longitudinally along the centerline 44 through the fluid conduit 40 between the first end 46 and the second end 48 (see FIG. 1). The sidewall 54 may have a generally circular cross-sectional geometry as illustrated in FIG. 3. The fluid conduit 40, however, is not limited to such a cross-sectional geometry; e.g., the sidewall 54 may alternatively have an elongated cross-sectional geometry.

Figure 6:
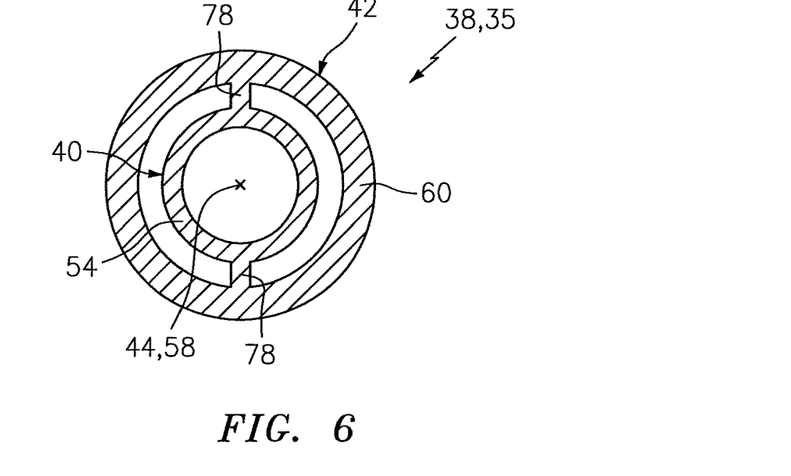
FIGS. 6-8 are cross-sectional illustrations of alternate embodiment shrouded conduits.

The shroud 42 extends longitudinally along a centerline 58, which may be substantially parallel with the centerline 44. Alternatively, the centerline 58 may be (e.g., acutely) angled relative to the centerline 44. The centerline 58 may be laterally offset (e.g., offset in a radial or tangential direction) from the centerline 44 as illustrated in FIGS. 3 and 4. Alternatively, the centerline 58 may be substantially co-axial with the centerline 44 (see FIGS. 6 and 7).

Referring to FIG. 1, the shroud 42 may extend longitudinally across the fluid flowpath 24. Alternatively, referring to FIG. 2, the shroud 42 may extend longitudinally partially into (or out of) the fluid flowpath 24 to, for example, the component 26 (e.g., a fuel injector nozzle). The shroud 42 may also be attached (e.g., mechanically fastened, welded, brazed, adhered and/or otherwise bonded) to the structure 22 and/or the component 26.

The shroud 42 may be configured as a fluid dynamic hollow foil (e.g., an airfoil, a vane, etc.) that circumscribes and shields the fluid conduit 40. The shroud 42 of FIGS. 3 and 4, for example, has a generally tubular sidewall 60 forming a channel (or flowpath), which may be divided by the fluid conduit 40 into a plurality of sub-channels 62 and 64 as described below in further detail. These channels 62 and 64 may extend longitudinally through (or into or within) the shroud 42, and may be arranged on opposing lateral sides of the fluid conduit 40. With such a configuration, the sidewall 60 as well as fluid (e.g., air) within the channels 62 and 64 may insulate the fluid conduit 40 from the fluid (e.g., high temperature compressed air) within the fluid flowpath 24 (see FIG. 1).

The sidewall 60 may have an elongated cross-sectional geometry, which may be configured to reduce effects of drag within the fluid flowpath 24 (see FIG. 1). The shroud 42, however, is not limited to such an elongated or fluid dynamic cross-sectional geometry as illustrated in FIG. 3; e.g., the sidewall 60 may have a generally circular cross-sectional geometry (see FIG. 6).

Referring to FIG. 3, the fluid conduit 40 may be laterally connected to and formed partially integral with the shroud 42. A first portion 66 of the fluid conduit 40, for example, is laterally connected to and formed integral with a first portion 68 of the shroud 42. A second portion 70 of the fluid conduit 40 may also be formed integral with a second portion 72 of the shroud 42. The second portions 70 and 72 may be substantially laterally (e.g., diametrically) opposed to the first portions 66 and 68. In this manner, the fluid conduit 40 may divide and fluidly separate the channel of the shroud 42 into the sub-channels 62 and 64.

In some embodiments, the fluid conduit 40 may be directly connected to the shroud 42. For example, an outer surface 74 of the fluid conduit 40 may be contiguous with an inner surface 76 of the shroud 42 as illustrated in FIG. 3.

Figure 7:
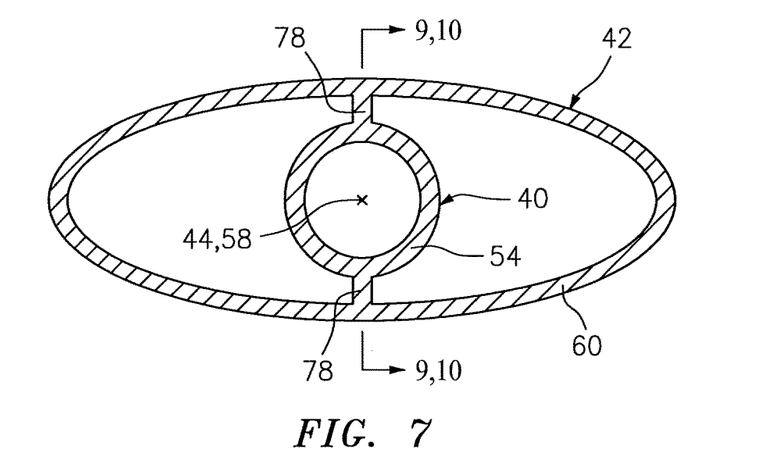
Figure 8:
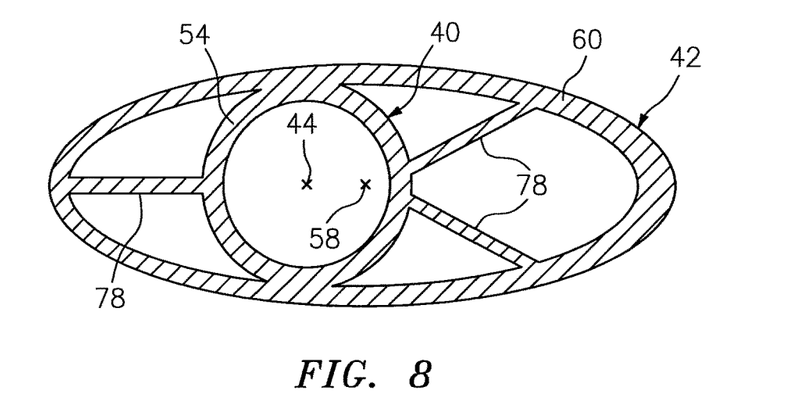
Figure 9:
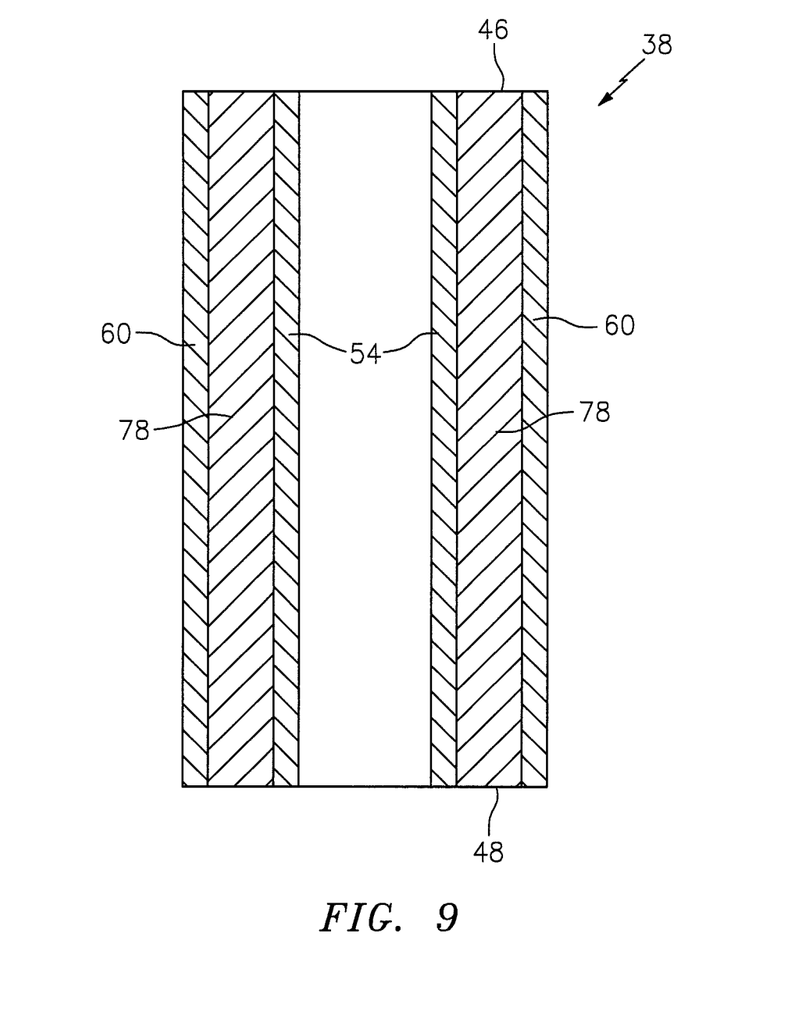
FIGS. 9 and 10 are side sectional illustrations of embodiments of the shrouded conduit of FIG. 7.
Figure 10:
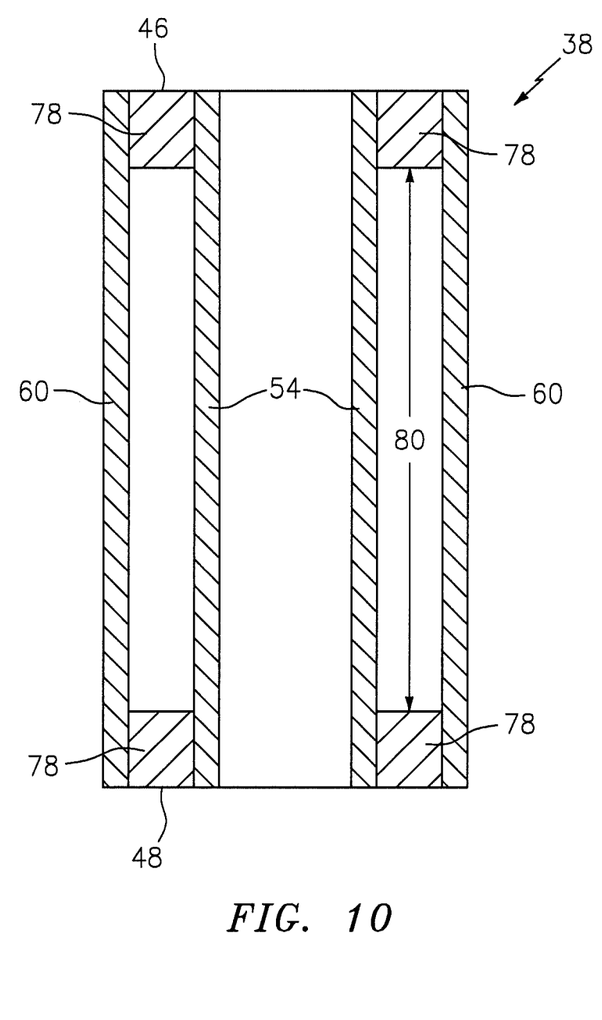

In some embodiments, referring to FIGS. 7 and 8, the fluid conduit 40 may be indirectly connected to the shroud 42 through one or more spars 78. Referring to FIG. 9, one or more of the spars 78 may extend longitudinally a longitudinal length of the fluid conduit 40 and/or a longitudinal length of the shroud 42. Referring to FIG. 10, one or more of the spars 78 may also or alternatively extend longitudinally a partial longitudinal length of the fluid conduit 40 and/or a partial longitudinal length of the shroud 42. For example, at least some of the spars 78 may be laterally aligned and separated by a longitudinal distance 80. One or more of the spars 78 may also or alternatively at least partially longitudinally overlap; e.g., may be longitudinally aligned. It is worth noting, in addition to connecting the fluid conduit 40 to the shroud 42, one or more of the aforedescribed spars 78 may also serve to structurally reinforce the shroud sidewall 60, which may allow for a thinner sidewall 60 thickness.

Figure 11:
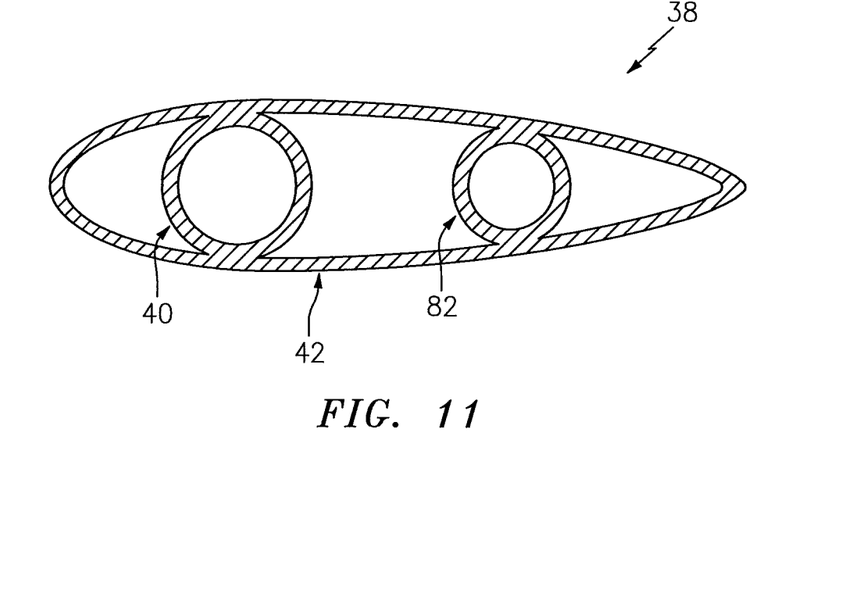
FIGS. 11-14 are cross-sectional illustrations of alternate embodiment shrouded conduits.
Figure 12:
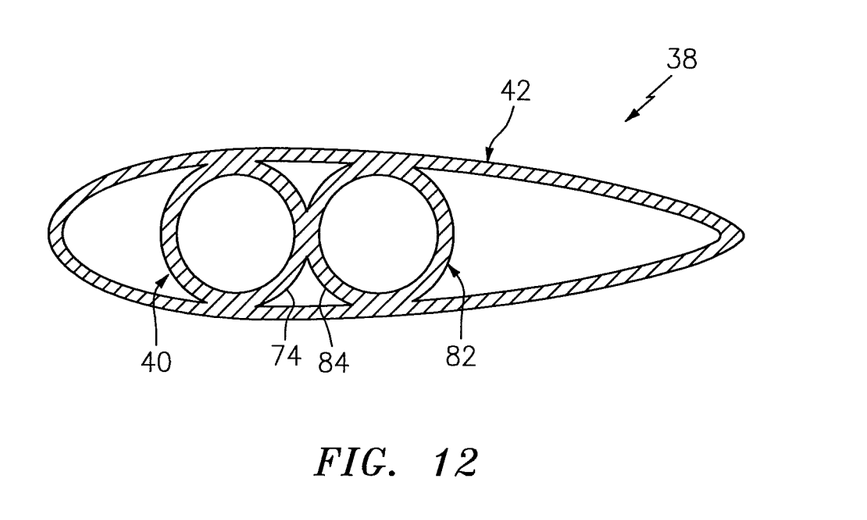

In some embodiments, referring to FIGS. 11 and 12, the shrouded conduit 38 may include at least one additional fluid conduit 82. The fluid conduit 82 may have a similar (or different) configuration to the fluid conduit 40 as described above. Referring to FIG. 11, the fluid conduits 40 and 82 may be formed as separate units; e.g., indirectly connected through the shroud 42 (and/or through at least one spar). Alternatively, referring to FIG. 12, the fluid conduits 40 and 82 may be directly connected together. For example, outer surfaces 74 and 84 of the fluid conduits 40 and 82 may be contiguous with one another.

Figure 13:
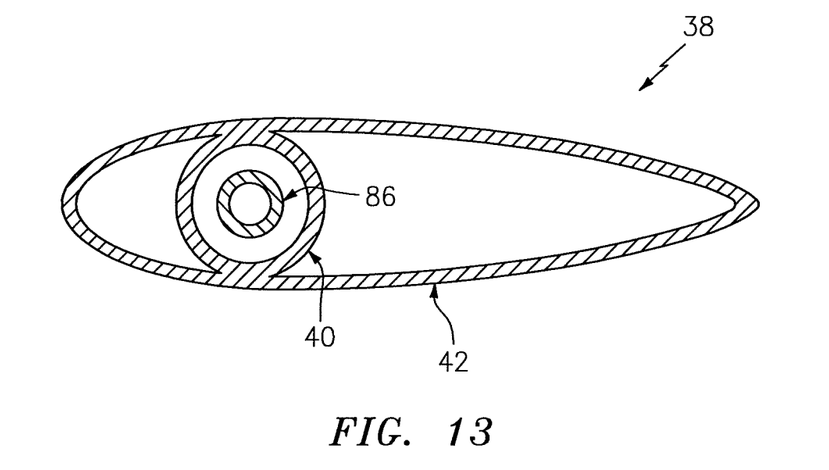
Figure 14:
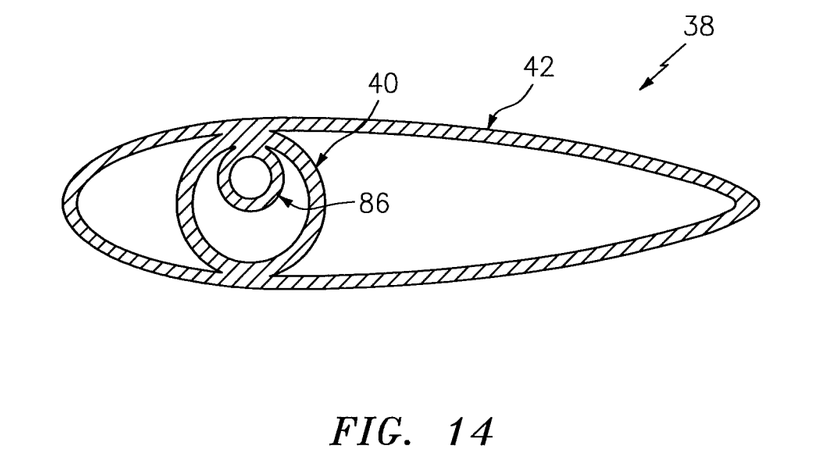

In some embodiments, referring to FIGS. 13 and 14, a fluid conduit 86 may extend longitudinally in the fluid conduit 40. This fluid conduit 86 may be discrete from the fluid conduit 40 and the shrouded conduit 38 as illustrated in FIG. 13. Alternatively, referring to FIG. 14, the fluid conduit 86 may be connected to and/or formed integral with the fluid conduit 40 in a similar manner as described above between the fluid conduit 40 and the shroud 42.

One or more of the components 40, 42, 78, 82 and/or 86 of the shrouded conduit 38 may have various configurations other than those described above. The shrouded conduit 38 therefore is not limited to the specific component configurations described above. For example, while the centerlines 44 and 58 of the fluid conduit 40 and the shroud 42 are shown as substantially straight (e.g., axial) in FIG. 4, at least a portion of the centerline 44 and/or 58 may alternatively follow a curved trajectory. Thus, at least a portion of the fluid conduit 40 and/or the shroud 42 may be curved.

The shrouded conduit 38 embodiments described above and illustrated in the drawings may be manufactured using various processes. One or more of the shrouded conduit components 40, 42, 78, 82 and/or 86 may be formed integral with one another; e.g., formed as a single unit. Alternatively or in addition, one or more of the shrouded conduit components 40, 42, 78, 82 and/or 86 may be formed discrete from one another; e.g., as physically separate units. These discrete components may subsequently be assembled and attached to one another; e.g., mechanically fastened and/or bonded.

The shrouded conduit components 40, 42, 78, 82 and/or 86 may be formed discretely or together using an additive manufacturing process. The term "additive manufacturing" may describe a process where an additive manufacturing system builds up a part or parts in a layer-by-layer fashion. For each layer, for example, the additive manufacturing system may spread and compact a layer of additive manufacturing material (e.g., metal powder and/or non-metal powder) and solidify one or more portions of this material layer with an energy beam; e.g., a laser beam or an electron beam. Examples of an additive manufacturing system include, but are not limited to, a laser sintering system, an electron beam system, a laser powder deposition system and an EB wire deposition system. Examples of metal(s) from which the shrouded conduit 38 may be formed include, but are not limited to, nickel (Ni), titanium (Ti), steel, stainless steel, cobalt (Co), chromium (Cr), tungsten (W), molybdenum (Mo) and/or alloys including one or more of the foregoing metals such as Waspaloy, Stellite, etc. The shrouded conduit components, however, are not limited to be formed using additive manufacturing or the foregoing metal materials. For example, one or more of the shrouded conduit components may also or alternatively be formed using casting, machining, milling and/or any other manufacturing process.

The fluid delivery system 20 of FIG. 1 may be configured with or included in various types of apparatuses and systems. The fluid delivery system 20, for example, may be configured in a fuel delivery system, a lubrication system and/or a cooling or heating system of a turbine engine or any other type of engine. An example of such a turbine engine 94 (e.g., a geared turbofan engine) is illustrated in FIG. 15.

Figure 15:
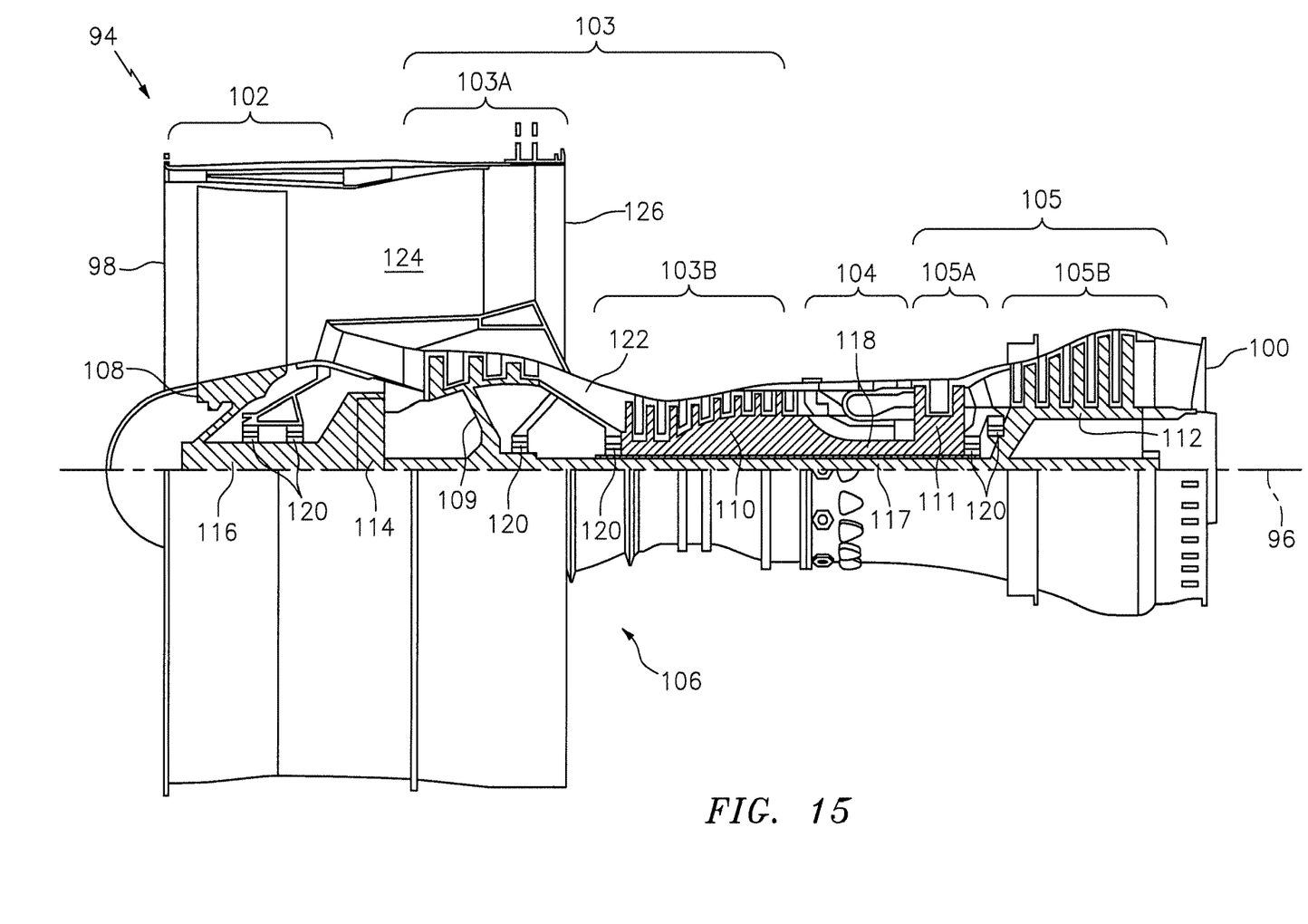
FIG. 15 is a side cutaway illustration of a geared turbine engine.

The turbine engine 94 of FIG. 15 extends along an axial centerline 96 between an upstream airflow inlet 98 and a downstream airflow exhaust 100. The turbine engine 94 includes a fan section 102, a compressor section 103, a combustor section 104 and a turbine section 105. The compressor section 103 includes a low pressure compressor (LPC) section 103A and a high pressure compressor (HPC) section 103B. The turbine section 105 includes a high pressure turbine (HPT) section 105A and a low pressure turbine (LPT) section 105B. The engine sections 102-105 are arranged sequentially along the centerline 96 within a housing 106.

Each of the engine sections 102-103B, 105A and 105B includes a respective rotor 108-112. Each of these rotors 108-112 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 108 is connected to a gear train 114, for example, through a fan shaft 116. The gear train 114 and the LPC rotor 109 are connected to and driven by the LPT rotor 112 through a low speed shaft 117. The HPC rotor 110 is connected to and driven by the HPT rotor 111 through a high speed shaft 118. The shafts 116-118 are rotatably supported by a plurality of bearings 120; e.g., rolling element and/or thrust bearings. Each of these bearings 120 is connected to the engine housing 106 by at least one stationary structure such as, for example, an annular support strut.

During operation, air enters the turbine engine 94 through the airflow inlet 98, and is directed through the fan section 102 and into a core gas path 122 and a bypass gas path 124. The air within the core gas path 122 may be referred to as "core air". The air within the bypass gas path 124 may be referred to as "bypass air". The core air is directed through the engine sections 103-105 and exits the turbine engine 94 through the airflow exhaust 100 to provide forward engine thrust. Within the combustor section 104, fuel is injected into a combustion chamber and mixed with the core air. This fuel-core air mixture is ignited to power the turbine engine 94. The bypass air is directed through the bypass gas path 124 and out of the turbine engine 94 through a bypass nozzle 126 to provide additional forward engine thrust. Alternatively, at least some of the bypass air may be directed out of the turbine engine 94 through a thrust reverser to provide reverse engine thrust.

The fluid delivery system 20 may be included in various turbine engines other than the one described above as well as in various other types of apparatuses and systems. The fluid delivery system 20, for example, may be included in a geared turbine engine where a gear train connects one or more shafts to one or more rotors in a fan section, a compressor section and/or any other engine section. Alternatively, the fluid delivery system 20 may be included in a turbine engine configured without a gear train. The fluid delivery system 20 may be included in a geared or non-geared turbine engine configured with a single spool, with two spools (e.g., see FIG. 15), or with more than two spools. The turbine engine may be configured as a turbofan engine, a turbojet engine, a propfan engine, or any other type of turbine engine. The present invention therefore is not limited to any particular turbine engine types or configurations. Furthermore, while the fluid delivery system 20 is described above as being included in a turbine engine, the system 20 may also be configured with various non-turbine engine systems; e.g., HVAC systems, automobile systems, etc.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An assembly, comprising:
   a fluid source;
   a fuel injector nozzle;
   a fluid conduit fluidly coupled with the fluid source and the fuel injector nozzle, and configured to provide liquid received from the fluid source to the fuel injector nozzle; and
   a shroud circumscribing and shielding the fluid conduit;
   wherein, when viewed in a plane perpendicular to a centerline of the fluid conduit, a first portion of the shroud is connected laterally to a first portion of the fluid conduit by a first spar at a first connection, and wherein the first spar is circumferentially adjacent and between a first hollow portion of the shroud and a second hollow portion of the shroud;
   wherein, when viewed in the plane perpendicular to the centerline, a second portion of the shroud is connected laterally to a second portion of the fluid conduit by a second spar at a second connection, and wherein the second spar is circumferentially adjacent and between a third hollow portion of the shroud and a fourth hollow portion of the shroud;
   wherein, when viewed in the plane perpendicular to the centerline, a third portion of the shroud is connected laterally to a third portion of the fluid conduit by a third spar at a third connection, and wherein the third spar is circumferentially adjacent and between a fifth hollow portion of the shroud and the fourth hollow portion of the shroud;
   wherein, when viewed in the plane perpendicular to the centerline, a fourth portion of the shroud is directly connected laterally to and contiguous with a fourth portion of the fluid conduit at a fourth connection, and wherein the fourth connection is circumferentially adjacent and between the fifth hollow portion of the shroud and the first hollow portion of the shroud;
   wherein, when viewed in the plane perpendicular to the centerline, a fifth portion of the shroud is directly connected laterally to and contiguous with a fifth portion of the fluid conduit at a fifth connection, and wherein the fifth connection is circumferentially adjacent and between the second hollow portion of the shroud and the third hollow portion of the shroud; and
   wherein the first spar comprises a surface that extends uninterrupted from an outer surface of the fluid conduit to an inner surface of the shroud when viewed in the plane perpendicular to the centerline.

2. The assembly of claim 1, wherein
   the shroud extends longitudinally along a centerline; and
   the fluid conduit extends longitudinally in the shroud.

3. The assembly of claim 1, further comprising:
   a structure through which a fluid flowpath extends;
   wherein the shroud is disposed within the fluid flowpath.

4. The assembly of claim 1, wherein the fuel injector nozzle comprises a turbine engine fuel injector nozzle.

5. The assembly of claim 1, wherein the first portion of the shroud is formed integral with the first portion of the fluid conduit and the first spar at the first connection.

6. The assembly of claim 1, wherein
   the second spar comprises a second surface that extends uninterrupted from the outer surface of the fluid conduit to the inner surface of the shroud when viewed in the plane perpendicular to the centerline; and
   the third spar comprises a third surface that extends uninterrupted from the outer surface of the fluid conduit to the inner surface of the shroud when viewed in the plane perpendicular to the centerline.

7. An assembly, comprising:
a fluid source;
a fuel injector nozzle;
a fluid conduit fluidly coupled with the fluid source and the fuel injector nozzle, and configured to provide liquid received from the fluid source to the fuel injector nozzle; and
a shroud circumscribing and shielding the fluid conduit;
wherein, when viewed in a plane perpendicular to a centerline of the fluid conduit, a first portion of the shroud is indirectly connected laterally to a first portion of the fluid conduit by a first spar at a first connection, and wherein the first spar is circumferentially adjacent and between a first hollow portion of the shroud and a second hollow portion of the shroud;
wherein, when viewed in the plane perpendicular to the centerline, a second portion of the shroud is directly connected laterally to and contiguous with a second portion of the fluid conduit at a second connection, and wherein the second connection is circumferentially adjacent and between a third hollow portion of the shroud and the second hollow portion of the shroud;
wherein, when viewed in the plane perpendicular to the centerline, a third portion of the shroud is directly connected laterally to and contiguous with a third portion of the fluid conduit at a third connection, and wherein the third connection is circumferentially adjacent and between a fourth hollow portion of the shroud and the first hollow portion of the shroud; and
wherein the first spar comprises a surface that extends uninterrupted from an outer surface of the fluid conduit to an inner surface of the shroud when viewed in the plane perpendicular to the centerline.

\* \* \* \* \*